March 30, 1943.  J. N. MEADE  2,315,444
INSULATED RAIL JOINT AND INSULATION THEREFOR
Filed Feb. 6, 1942
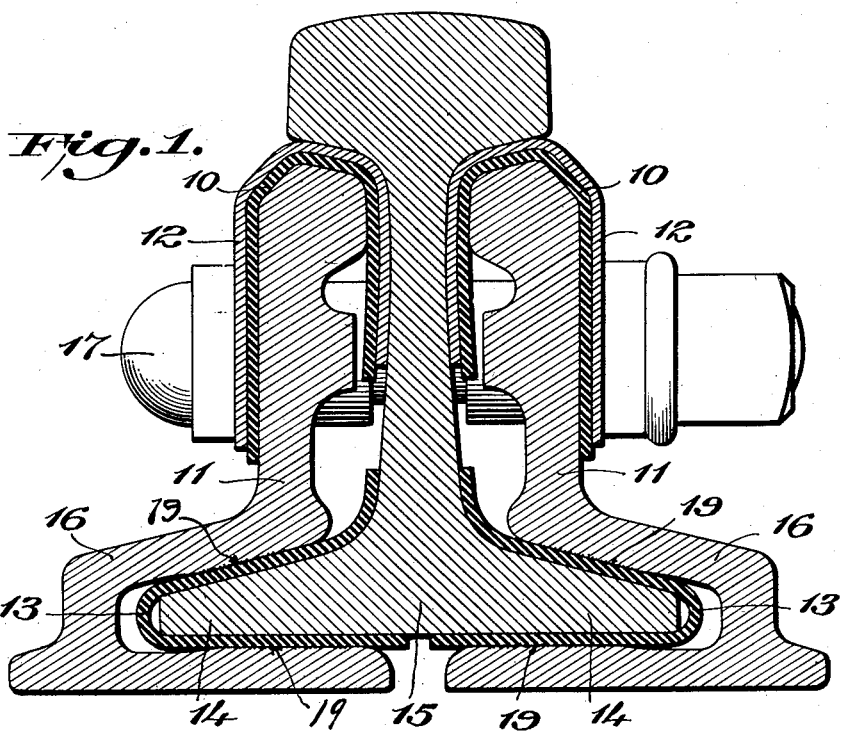
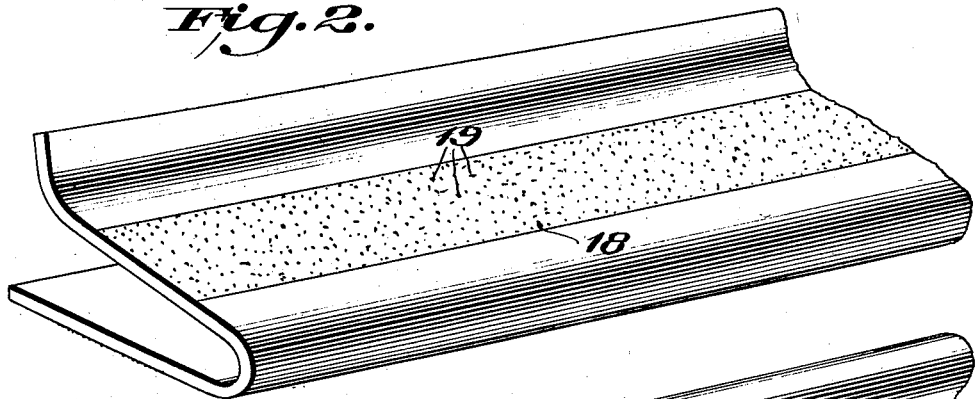
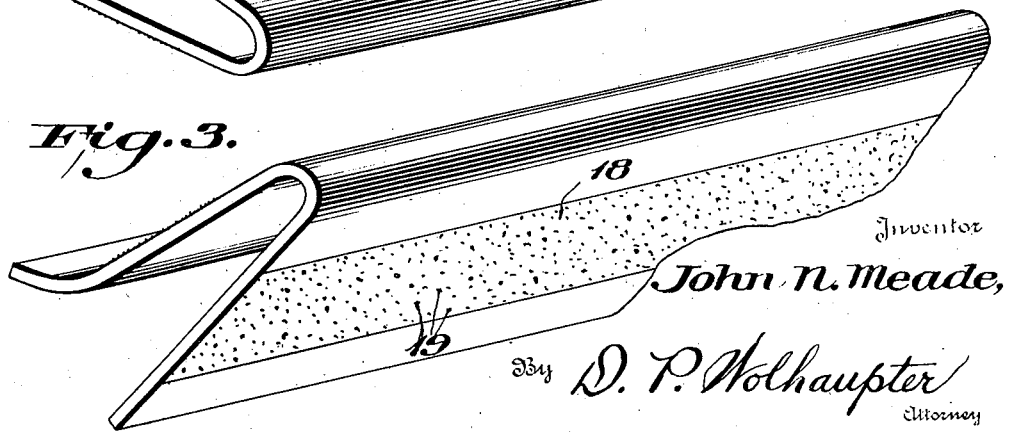
Inventor
John N. Meade,
By D. P. Wolhaupter
Attorney Patented Mar. 30, 1943

2,315,444

UNITED STATES PATENT OFFICE 2,315,444

INSULATED RAIL JOINT AND INSULATION THEREFOR

John N. Meade, Denver, Colo., assignor to Poor & Company, New York, N. Y., a corporation of Delaware Application February 6, 1942, Serial No. 429,840

5 Claims. (Cl. 238—155)

This invention relates to improvements in insulation for insulated rail joints, and to insulated rail joints embodying the improved insulation.

Insulated rail joints are employed in railway track to interrupt signal circuits employing the track rails as conductors, and usually such joints include elongated head and base pieces of sheet insulation interposed between the splice bars and the rails. In such insulated rail joints it is known to interlock one or the other or both of said pieces of insulation with the joint bolts to positively prevent any endwise creeping of either or both of said pieces of insulation from the joint. However, from the standpoint of conservation of valuable material and because of other considerations it is impractical to design both of said pieces of insulation for interlocking cooperation with the joint bolts. Therefore, in most insulated joints at least one of said pieces of insulation is free to creep endwise from the joint, except as resisted by its non-positive, frictional cooperation with the splice bar and the rail. Accordingly, there constantly exists the possibility that any such piece of non-positively restrained insulation may creep endwise from the joint with resulting loosening of the joint and affectation of the signal circuit, and in either of these events serious and possibly disastrous consequences may follow.

The general object of the present invention is to provide simple means for practically and positively holding or restraining against longitudinal or endwise creeping movement from a joint either a head or a base piece of insulation of the type which is not interlocked with the joint bolts or which is not otherwise positively restrained against such movement, and further in this connection it is a more particular object of the invention to provide simple means for the purpose stated which may readily and easily be embodied in the insulation at very little cost and which functions in a highly efficient manner.

With the foregoing and other objects in view, which will become more fully apparent as the nature of the invention is better understood, the same consists in the novel insulation construction and in the novel features of a joint embodying the novel insulation, as will be hereinafter more fully described, illustrated in the accompanying drawing and defined in the appended claims.

In the accompanying drawing, wherein is illustrated a practical embodiment of the invention and wherein like characters of reference denote corresponding parts in the separate views:

Figure 1 is a cross section through an insulated rail joint of a well known type including head the base pieces of insulation and showing the invention applied to the base pieces of insulation.

Figure 2 is a fragmentary perspective view of one of the base pieces of insulation looking toward the upper side thereof; and Figure 3 is a similar view of the same piece of insulation looking toward the lower side thereof.

Referring to the drawing in detail, it will be observed that the insulated rail joint illustrated in Fig. 1 is of the so-called continuous, armored, type characterized by having head pieces 10 of sheet insulation of inverted U-shape in cross section engaged over the heads of the splice bars 11 and protectively covered by sheet metal armor elements 12 of similar cross sectional shape, and further characterized by having base pieces 13 of sheet insulation of substantially C-shape in cross section embracing the base flanges 14 of the rail 15 and themselves embraced by substantially C-shaped base portions 16 of the splice bars 11. It is to be understood, however, that this joint has merely been chosen arbitrarily for purposes of illustrating one specific embodiment of the invention and merely is representative of a large number of joints of specifically different constructions including insulation pieces such as the head and base pieces 10 and 13 to which the invention may be applied. In fact, the invention is applicable to any piece of insulation which is not in some way positively locked in a joint against possible creeping out of operative position.

In joints of the general type illustrated and in accordance with known practice, either or both of the insulating pieces 10, 13 may include a skirt portion extending to the joint bolts and having recesses or openings therein through which the joint bolts 17 may extend, and in that case the piece or pieces of insulation will be held positively against endwise movement from the joint and there is no need of the present invention. However, to provide either or both of the insulating pieces 10, 13 with a skirt portion to extend to the joint bolts for interlocking cooperation therewith involves the use of considerable insulating material which could be saved if the insulation could otherwise be held effectively against loss from the joint. Accordingly, the present invention has in view not only to provide means for effectively retaining in joints pieces of insulation which have not heretofore been positively interlocked with the joint bolts against loss from the joints, but to enable considerable saving of material in respect to insulating pieces which heretofore have been provided with skirt portions for interlocking cooperation with the joint bolts by eliminating any necessity of the skirt portions insofar as they are employed for retaining the insulation in the joint.

To provide the necessary secure holding of the insulation sheet in its operative position, without the use of mechanical locking means of any character, the invention involves securing or fastening to a surface of the insulation sheet, in any suitable manner, a holding means or area consisting of hard gritty material, of any suitable substance, such as Carborundum or equivalent material, which under the influence of the tightening of the joint bolts, with resultant clamping of the insulation between the splice bars and the rails, will bite into or become embedded in the splice bar or the rail, or both, and in some instances in the insulation and thus act in a practically positive manner to hold the insulation against creeping from the joint.

Grits of Carborundum are very suitable for the purposes of the invention and one practical manner of applying them is first to apply a suitable adhesive to the insulation and then, before the adhesive has set or hardened, to sprinkle the grits on the adhesive. In this connection, 18 designate in Figs. 2 and 3 bands of adhesive applied to the top and bottom faces of the top and bottom portions, respectively, of the base piece 13 of insulation and 19 designate grits applied to said faces by means of said adhesive for cooperation with said faces of said piece of insulation and likewise for cooperation with the related or insulation engaging faces of the base of the splice bar when the insulation is placed in the joint and the joint bolts are tightened. Obviously, when the grits are applied in this manner they will bite into the insulation as well as into the splice bar or the rail, or both, when the joint bolts are tightened.

Instead of the grits 19 being applied to the insulation in the form of a band, they may be applied to isolated areas of the insulation. Moreover, instead of said grits being applied only to the face or faces of the insulation which is or are engaged by the splice bar, they may be applied also to the face or faces of the insulation which is or are engaged by the rail flange, or they may be applied only to the latter face or faces to the exclusion of the face or faces which are engaged by the splice bar. Furthermore, they may obviously be applied to the head piece 10 of insulation, or to any other piece of insulation, in the same manner as set forth in connection with the base piece 13 of insulation or in any other suitable manner. Moreover, they may be carried by strips or pieces of cloth, paper or other thin sheet material which strips or pieces may be affixed to the insulation either adhesively or by any suitable mechanical fastening means or by being embedded in the insulation by pressure or in any other suitable manner while the insulation is in a soft condition during its manufacture, in which case they will be held by the sheet material against movement relative to the insulation and will not be required to bite into the insulation but only into the splice bar or the rail, or both, as the case may be. In any event the grits will serve effectively to retain the insulation in the joint if it is not in some manned positively locked therein.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A piece of insulating material for a rail joint having directly secured to a face thereof holding means consisting of hard gritty material for biting engagement with a metal element of the joint when the joint is tightened.

2. A piece of insulating material for a rail joint having adhesively secured to a face thereof holding means consisting of hard gritty material for biting engagement with a metal element of the joint when the joint is tightened.

3. A piece of insulating material for a rail joint having secured to a face thereof hard gritty material to bite into the insulation and into the metal of the joint element which is forced into engagement with said face under the influence of tightening of the joint, thereby to restrain the insulation against creeping from the joint, the gritty material being applied to said face in the form of a band extending along that portion of said face which is engaged by the related element of the joint.

4. An elongated piece of sheet insulation for a rail joint to be interposed between a splice bar element and a rail element, said piece of insulation having secured to that portion of a face thereof which engages one of said elements, grits of hard material to bite into the insulation and into said element under the influence of tightening of the joint, thereby to substantially positively restrain said piece of insulation against creeping from the joint.

5. An insulated rail joint including a rail element, a splice bar element, a piece of insulating material interposed between the splice bar and the rail, and grits of hard material embedded in the insulation and having biting engagement with one of said joint elements to substantially positively restrain the insulation against creeping from the joint.

JOHN N. MEADE.